Jan. 4, 1955   R. F. PENDERGAST ET AL   2,698,481
CORN PARING KNIFE
Filed July 17, 1952
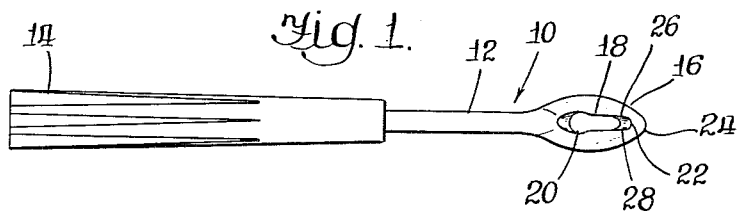
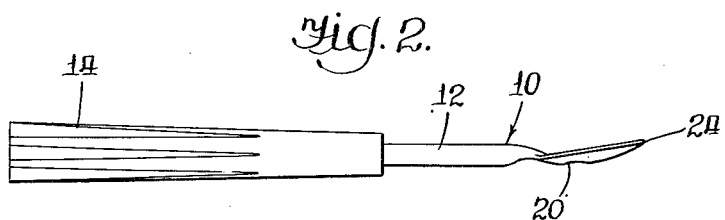
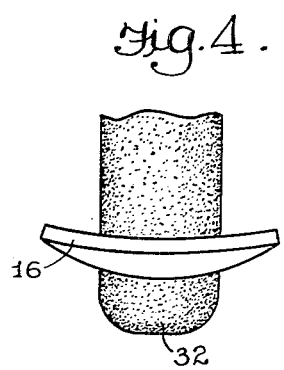
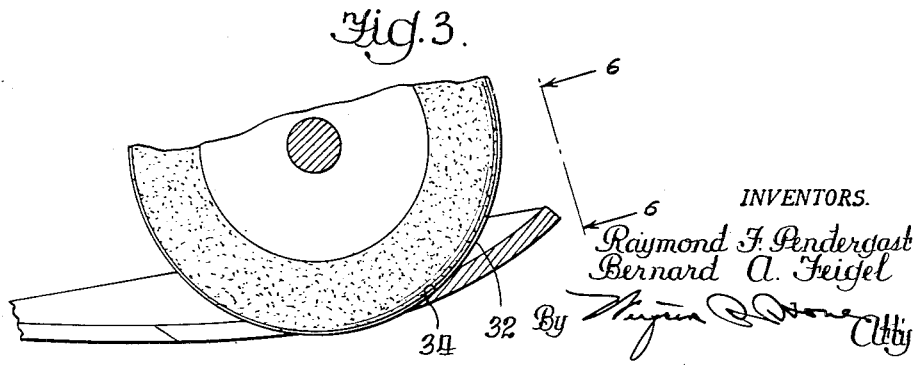
INVENTORS.
Raymond F. Pendergast
Bernard A. Feigel

United States Patent Office 2,698,481
Patented Jan. 4, 1955

2,698,481

CORN PARING KNIFE

Raymond F. Pendergast and Bernard A. Feigel, Chicago, Ill.; said Feigel assignor to said Pendergast Application July 17, 1952, Serial No. 299,396

2 Claims. (Cl. 30—27)

This invention relates to a corn paring knife, and more particularly to an inside cutting edge on a spoon-type corn paring knife.

In the accompanying drawings:
Fig. 1 is a plan view of the knife;
Fig. 2 is a side elevation;
Fig. 3 is a view centrally longitudinally of applicants' knife showing how the grinding wheel sharpens it; and
Fig. 4 is a view taken on the line 6—6 of Fig. 4.

The invention here is narrow. Referring to Figs. 1 and 2, there is shown a corn paring knife which, with the exception of one small feature, has been on the market for some years. The knife consists of a single sheet of metal 10, the shank of which has been rolled into a tube 12 and which is mounted in any suitable handle 14. The work end has been formed into a spoon 16 having a concave inside wall and a convex outside wall in the center of which is punched a keyhole slot 18 in which the large opening 20 is toward the handle and the pointed end 22 is toward the outer tip 24 of the spoon. The only cutting edge of this corn parer is between the points 26 and 28 on the keyhole slot. All of the other edges both around the outer edge of the spoon and around the keyhole slot are rounded so as not to cut.

For several years, this cutting edge has been made by passing the bottom of the spoon across a squared grinding wheel with the result that the actual cutting edge is in a flat plane. This means that a person drawing the knife across a human corn will make a cut approximately one-eighth or five-thirty-seconds of an inch wide. This plane surface in which the cutting edge lies loses the value of the convex spoon surface, which was in part an important feature in the success of the knife.

The present invention resides in just one thing, retaining the outer convex surface of the knife by doing the grinding inside the spoon so as to produce the arcuate cutting edge illustrated in Fig. 4. By this means one is able to make very fine clippings of a corn, which in turn means that one can stay away from live skin.

A grinding wheel of suitable peripheral cross section as illustrated at 32 is employed. It passes down between the slightly diverging side walls of the keyhole slot 18, see Fig. 1, and forms the cutting edge only in the tip 22 portion. The cutting surface is formed by grinding the portion 34, see Fig. 4.

Having thus described our invention, what we claim is:

1. A corn paring knife comprising a handle, an elongated concave spoon having a convex outer surface mounted on one end of the handle, an elongated slot through the spoon with its long axis extending away from the handle and with its transverse axis approximately centered in the spoon, the opposite long side walls of the slot being substantially parallel, and a cutting edge in the outer end wall of the slot at the convex surface thereof, the cutting edge being connected to the concave surface by a concave surface on the inner side of the spoon.

2. A corn paring knife comprising a handle, an elongated concave spoon having a convex outer surface mounted on one end of the handle, a keyhole slot through the spoon with its long axis extending away from the handle and with its transverse axis approximately centered in the spoon and with the large end of the keyhole slot toward the handle, the long side walls of the slot being substantially parallel, and a cutting edge in the outer end wall of the slot at the convex surface thereof, the cutting edge being connected to the concave surface by a surface concave on the inner side of the spoon.

References Cited in the file of this patent

UNITED STATES PATENTS

| Number | Name | Date |
|---|---|---|
| 490,377 | Trebbin | Jan. 24, 1893 |
| 1,002,377 | Ekenborg, Jr. | Sept. 5, 1911 |
| 1,489,603 | Kracht | Apr. 8, 1924 |